United States Patent
Schwefer et al.

(10) Patent No.: US 10,022,669 B2
(45) Date of Patent: Jul. 17, 2018

(54) PROCESS AND APPARATUS FOR ELIMINATING NOX AND N2O

(75) Inventors: Meinhard Schwefer, Meschede (DE); Michael Groves, Gevelsberg (DE); Christian Perbandt, Dortmund (DE); Rolf Siefert, Rheda-Wiedenbrück (DE)

(73) Assignee: thyssenkrupp Industrial Solutions AG, Essen (DE)

(*) Notice: Subject to any disclaimer, the term of this patent is extended or adjusted under 35 U.S.C. 154(b) by 26 days.

(21) Appl. No.: 13/700,853

(22) PCT Filed: May 9, 2011

(86) PCT No.: PCT/EP2011/002304
§ 371 (c)(1),
(2), (4) Date: Feb. 5, 2013

(87) PCT Pub. No.: WO2011/151006
PCT Pub. Date: Dec. 8, 2011

(65) Prior Publication Data
US 2013/0149225 A1   Jun. 13, 2013

(30) Foreign Application Priority Data
Jun. 4, 2010 (DE) .......... 10 2010 022 775

(51) Int. Cl.
  *B01D 53/56* (2006.01)
  *B01D 53/86* (2006.01)
  (Continued)

(52) U.S. Cl.
  CPC ....... *B01D 53/869* (2013.01); *B01D 53/8628* (2013.01); *B01D 53/8631* (2013.01);
  (Continued)

(58) Field of Classification Search
  None
  See application file for complete search history.

(56) References Cited

U.S. PATENT DOCUMENTS

| 4,571,329 A | 2/1986 | Kato et al. |
| 5,171,553 A | 12/1992 | Li et al. |
| (Continued) |

FOREIGN PATENT DOCUMENTS

| CN | 1395501 A | 2/2003 |
| CN | 1395542 A | 2/2003 |
| (Continued) |

OTHER PUBLICATIONS

Chen et al., "Activity and durability of Fe/ZSM-5 catalysts for lean burn NOx reduction in the presence of water vapor", Catalysis Today 4 (1998) 73-83).*
(Continued)

*Primary Examiner* — Anita Nassiri Motlagh
(74) *Attorney, Agent, or Firm* — Michael W. Ferrell; Ferrells, PLLC; Anna L. Kinney

(57) ABSTRACT

A process for removing $N_2O$ and $NO_x$ from offgases by catalytic decomposition of $N_2O$ by means of iron-containing zeolite catalysts and catalytic reduction of the $NO_x$ by means of reducing agents, the $deNO_x$ stage connected downstream of the $deN_2O$ stage being operated at inlet temperatures of $T \leq 400°$ C., and the inlet gas for the $deN_2O$ stage comprising water and having a selected $N_2O/NO_x$ ratio, and the operating parameters of temperature, pressure and space velocity of the $deN_2O$ stage being selected so as to result in an $N_2O$ degradation of 80 to 98%. Under these conditions, a degree of $NO_x$ oxidation of 30-70% is established at the outlet of the $deN_2O$ stage, which is defined as the ratio of the molar amounts of $NO_2$ to the total molar amount of $NO_x$. The result of this is that the downstream $deNO_x$ stage can be operated under optimal conditions. Also provided is an apparatus for carrying out the process.

23 Claims, 3 Drawing Sheets

(51) Int. Cl.
  *B01J 29/072* (2006.01)
  *B01J 29/46* (2006.01)
  *B01J 37/00* (2006.01)

(52) U.S. Cl.
  CPC .............. *B01D 2255/20738* (2013.01); *B01D 2255/50* (2013.01); *B01D 2255/504* (2013.01); *B01D 2257/402* (2013.01); *B01J 29/072* (2013.01); *B01J 29/46* (2013.01); *B01J 37/0009* (2013.01); *Y02C 20/10* (2013.01)

(56) References Cited

U.S. PATENT DOCUMENTS

| | | |
|---|---|---|
| 5,451,387 A | 9/1995 | Farnos et al. |
| 5,769,927 A | 6/1998 | Gottschlich et al. |
| 6,221,324 B1 | 4/2001 | Coq et al. |
| 6,266,977 B1 | 7/2001 | Howard et al. |
| 7,485,276 B2 | 2/2009 | Schwefer et al. |
| 7,595,034 B2 | 9/2009 | Nissinen et al. |
| 7,906,091 B2 | 3/2011 | Schwefer et al. |
| 7,976,697 B2 | 7/2011 | Krishnamoorthy et al. |
| 8,192,708 B2 | 6/2012 | Sasaki |
| 2003/0143141 A1 | 7/2003 | Schwefer et al. |
| 2003/0143142 A1 | 7/2003 | Schwefer et al. |
| 2006/0051277 A1 | 3/2006 | Schwefer et al. |
| 2006/0216215 A1* | 9/2006 | Johnson et al. ............ 422/173 |
| 2008/0207975 A1 | 8/2008 | Crone et al. |
| 2008/0241034 A1* | 10/2008 | Schwefer et al. ......... 423/239.2 |
| 2010/0089237 A1* | 4/2010 | Moreau ........................ 95/117 |
| 2010/0322834 A1 | 12/2010 | Ito et al. |

FOREIGN PATENT DOCUMENTS

| | | |
|---|---|---|
| CN | 1658956 A | 8/2005 |
| DE | 3626884 A1 | 9/1987 |
| DE | 10001541 B4 | 4/2005 |
| DE | 102004061772 A1 | 7/2006 |
| DE | 102008024427 A1 | 12/2009 |
| EP | 0756891 A1 | 2/1997 |
| EP | 0914866 A1 | 5/1999 |
| EP | 1148309 A1 | 10/2001 |
| EP | 1160000 A1 | 12/2001 |
| EP | 0955080 B1 | 7/2002 |
| GB | 1069981 A | 5/1967 |
| JP | H05305219 A | 11/1993 |
| JP | H06126177 A | 5/1994 |
| JP | 2000271445 A | 10/2000 |
| JP | 2006517857 A | 8/2006 |
| JP | 2008121629 A | 5/2008 |
| JP | 2008221029 A | 9/2008 |
| JP | 2008540094 A | 11/2008 |
| JP | 2009183827 A | 8/2009 |
| TW | 200642758 A | 12/2006 |
| WO | 1999034901 A1 | 7/1999 |
| WO | 2001/051181 A1 | 7/2001 |
| WO | 2001/051182 A1 | 7/2001 |
| WO | 2001/051415 A1 | 7/2001 |
| WO | WO0151181 A1 | 7/2001 |
| WO | 2001091887 A1 | 12/2001 |
| WO | 2004069385 A1 | 8/2004 |
| WO | 2007122678 A1 | 11/2007 |
| WO | 2009099426 A2 | 8/2009 |
| WO | 2009141028 A2 | 11/2009 |

OTHER PUBLICATIONS

Devadas et al., "Influence of NO2 on the selective catalytic reduction of NO with ammonia over Fe-ZSM5", Applied Catalysis B: Environmental 67 (2006) 187-196.*
Translation of International Preliminary Report on Patentability.
Bacher et al., Untersuchungen zur Kinetik der NO-Oxidation an Eisen-Zeolith-Katalysatoren, undated, no page numbers, volume or issue numbers, TU Clausthal Institut fur Chemische Verfahrenstechnik, Germany.
Kogel et al., The effect of NOx on the catalytic decomposition of nitrous oxide over Fe-MFI zeolites, Catalysis Communications, Nov. 2001, 273-276, 2-9, Elsevier Science B.V.
Koebel et al., Selective catalytic reduction of NO and NO2 at low temperatures, Catalysis Today, Apr. 15, 2002, 239-247, 73-3-4, Elsevier Science B.V.
Perez-Ramirez et al., NO-Assisted N2O Decomposition over Fe-Based Catalysts: Effects of Gas Phase Composition and Catalyst Constitution, Journal of Catalysis, May 15, 2002, 211-223, 208-1, Elsevier Science.
Perez-Ramirez et al., Formation and control of N2O in nitric acid production: Where do we stand today?, Applied Catalysis B-Environmental, Aug. 20, 2003, 117-151, 44-2, Elsevier Science B.V.
English-language translation of Taiwan IPO Search Report dated Feb. 9, 2015.
Translation of Japanese Office Action dated Jun. 29, 2015 in corresponding Japanese patent application.
F.J. Janssen, "Environmental Catalysis—Stationary Sources", Handbook of Heterogeneous Catalysis, 1997, pp. 1633-1668, vol. 4, Wiley VCH, Weinheim.
F. Kapteijn et al., "Heterogeneous catalytic decomposition of nitrous oxide", Applied Catalysis B: Environmental, 1996, pp. 25-64, vol. 9, Elsevier B.V.
M. Rauscher et al., "Preparation of a highly active Fe-ZSM-5 catalyst through solid-state ion exchange for the catalytic decomposition of N2O", Applied Catalysis A: General, 1999, pp. 249-256, vol. 184, Issue 2, Elsevier B.V.

* cited by examiner

PROCESS AND APPARATUS FOR ELIMINATING NOX AND N2O

CLAIM FOR PRIORITY

This application is a national phase non-provisional application based on PCT/EP2011/002304 filed May 9, 2011 which claimed priority to DE 10 2010 022 775.7 filed Jun. 4, 2010. The priority of these applications is hereby claimed and their disclosures incorporated herein by reference.

TECHNICAL FIELD

The invention relates to a process and to an apparatus for catalytic elimination of $NO_x$ and $N_2O$.

BACKGROUND

Many processes, for example combustion processes, or industrial production of nitric acid or caprolactam, result in an offgas laden with nitrogen monoxide NO, nitrogen dioxide $NO_2$ (referred to collectively as $NO_x$) and dinitrogen monoxide $N_2O$. While NO and $NO_2$ have long been known to be compounds of ecotoxic relevance (acid rain, smog formation), and global limits have been fixed for the maximum permissible emissions thereof, dinitrogen monoxide too has become the subject of increasing attention in environmental protection in the last few years, since it contributes to a not inconsiderable degree to the degradation of stratospheric ozone and to the greenhouse effect. For reasons of environmental protection, there is therefore an urgent need for technical solutions for elimination of the dinitrogen monoxide emissions together with the $NO_x$ emissions.

There are already numerous known options for elimination of $N_2O$ on the one hand and $NO_x$ on the other hand.

In the case of $NO_x$ reduction, selective catalytic reduction (SCR) of $NO_x$ by means of ammonia in the presence of vanadium-containing $TiO_2$ catalysts should be emphasized (cf., for instance, G. Ertl, H. Knözinger, J. Weitkamp: Handbook of Heterogeneous Catalysis, vol. 4, pages 1633-1668, VCH Weinheim (1997)). According to the catalyst, this can proceed at temperatures of approx. 150° C. to approx. 450° C. and is operated on the industrial scale preferably between 200° C. and 400° C., especially between 250° C. and 350° C. It is the variant usually used for reducing the $NO_x$ level in offgases from industrial processes, and enables $NO_x$ degradation of more than 90%.

There are also processes for reduction of $NO_x$ based on zeolite catalysts, which proceed using a wide variety of different reducing agents. In addition to Cu-exchanged zeolites (cf., for example, EP-A-914,866), iron-containing zeolites in particular appear to be of interest for practical applications.

For instance, U.S. Pat. No. 5,451,387 describes a process for selective catalytic reduction of $NO_x$ with $NH_3$ over iron-exchanged zeolites, which operates preferably at temperatures between 200 and 550° C., especially around 400° C.

EP-A-756,891 describes a process for reduction of $NO_x$ by means of $NH_3$ in the presence of honeycomb monoliths composed of iron-containing ZSM-5 zeolites. An advantage of the Fe zeolite catalysts over conventional $V_2O_5$—$TiO_2$-based deNO$_x$ catalysts is likewise the extended temperature range from 200° C. to 600° C.

However, a disadvantage of Fe zeolite catalysts for $NO_x$ reduction is the availability and cost thereof. The latter is much higher compared to widespread and established $V_2O_5$—$TiO_2$-based deNO$_x$ catalysts.

In contrast to the reduction of the $NO_x$ level in offgases, which has been established in industry for many years, there exist only a few industrial processes for $N_2O$ elimination, which are usually aimed at thermal or catalytic degradation of the $N_2O$. An overview of the catalysts which have been demonstrated to be suitable in principle for degradation and for reduction of dinitrogen monoxide is given by Kapteijn et al. (Kapteijn F. et al., Appl. Cat. B: Environmental 9 (1996) 25-64). The catalytic decomposition of dinitrogen monoxide to $N_2$ and $O_2$ gives the advantage over catalytic reduction with selected reducing agents, such as $NH_3$ or hydrocarbons, that no costs arise for the consumption of reducing agents. However, effective lowering of the $N_2O$ level based on a catalytic decomposition, in contrast to $N_2O$ or else $NO_x$ reduction, can be achieved effectively only at temperatures greater than 400° C., preferably greater than 450° C.

Again, transition metal-laden zeolite catalysts appear to be particularly suitable for catalytic decomposition of $N_2O$ to $N_2$ and $O_2$ (U.S. Pat. No. 5,171,553).

Iron-laden zeolite catalysts are described as especially advantageous (for example in EP-A-955,080 or WO-A-99/34,901). The activity of the Fe zeolite catalysts for $N_2O$ decomposition is enhanced considerably by the simultaneous presence of $NO_x$, as detailed scientifically, for example, by Kögel et al. in Catalysis Communications 2 273-276 (2001) or by Perez-Ramirez et al. in Journal of Catalysis 208, 211-223 (2003).

The combined elimination of $NO_x$ and $N_2O$ based on a catalytic reduction of the $NO_x$ with $NH_3$ (in a deNO$_x$ stage) and a catalytic decomposition of $N_2O$ to $N_2$ and $O_2$ over iron-containing zeolite catalysts (in a deN$_2$O stage) has also been described in the patent literature.

For example, DE 10 001 541 B4 claims a process for eliminating $NO_x$ and $N_2O$ from the residual gas of nitric acid production, wherein the offgas to be cleaned is passed first through a deNO$_x$ stage and then through a deN$_2$O stage with iron-laden zeolite catalysts. In the deNO$_x$ stage, the $NO_x$ content is reduced to such an extent that an optimal $NO_x$/$N_2O$ ratio of 0.001-0.5 is established, which leads to accelerated $N_2O$ degradation in the downstream deN$_2$O stage.

The selected sequence of process stages is very advantageous from a process and chemical engineering point of view, since the process is arranged in the residual gas of the nitric acid production, between absorption tower and residual gas turbine in an ascending temperature profile; in other words, the residual gas at first, before entry into the deNO$_x$ stage, has a low inlet temperature which is <400° C., preferably <350° C., and so conventional deNO$_x$ catalysts based on $V_2O_5$—$TiO_2$ can also be used. The deNO$_x$ stage, before entry into the deN$_2$O stage, is then followed by a (single) heating of the residual gas to 350-500° C., such that effective catalytic $N_2O$ decomposition is possible. The offgas is then supplied to a residual gas turbine in which the heat content of the offgas is recovered with decompression and cooling.

A reverse connection of the two process stages is also possible, i.e. in a sequence in which $N_2O$ degradation is first provided and is then followed by NO degradation, as taught in WO-A-01/51181.

For this purpose, the offgas is passed at a homogeneous temperature of <500° C. through two reaction zones which comprise iron-laden zeolite catalysts and may be spatially separate from one another or connected to one another. In this case, the $N_2O$ is decomposed in the deN$_2$O stage initially at an unreduced $NO_x$ content, i.e. with full exploitation of the cocatalytic $NO_x$ effect on the $N_2O$ decomposition, and this is followed, after intermediate addition of ammonia, by the catalytic $NO_x$ reduction. Since the NO reduction should preferably proceed at the same temperature as the $N_2O$ decomposition, Fe zeolite catalysts are likewise used in the $deNO_x$ stage, which, in contrast to conventional SCR catalysts, for example $V_2O_5$—$TiO_2$-based catalysts, can also be operated at higher temperatures>400° C. Intermediate cooling of the process gas is thus not required.

If it were desired, for example for reasons of cost, to employ less expensive SCR catalysts, such as $V_2O_5$—$TiO_2$-based catalysts, in place of the Fe zeolite catalysts, cooling of the residual gas would thus always be required downstream of the $deN_2O$ stage for operation of the $deNO_x$ stage. This would be highly advantageous especially when, even in the case of use of other $deNO_x$ catalysts, for example Fe zeolite-based catalysts, as a result of the specific application, for example in a plant for preparation of nitric acid by what is called the mono-medium pressure process or, for example, in a plant for preparation of caprolactam, a low exit temperature downstream of the denitrification unit is desired or required.

In this case, the person skilled in the art in the field of offgas cleaning is, however, confronted with the following problem, which makes the operation of a conventional $deNO_x$ stage at a low temperature level downstream of a $deN_2O$ stage comprising Fe zeolite catalysts appear to be technically and economically very disadvantageous.

For instance, Fe zeolite catalysts are known, as shown, for example, by Kögel et al. in Catalysis Communications 2 273-276 (2001) or by Perez-Ramirez et al. in Journal of Catalysis 208, 211-223 (2002), not only to accelerate $N_2O$ decomposition but also, in the presence of $NO_x$, also to shift the $NO/NO_2$ ratio or the degree of $NO_x$ oxidation in an accelerated manner. The latter is defined as the molar proportion of $NO_2$ in the total molar amount of $NO_x$ (=sum of NO and $NO_2$); in other words, the higher the operating temperature of the $deN_2O$ stage, the more rapidly and the greater the extent to which the $NO/NO_2$ ratio approaches the thermodynamically defined equilibrium position at the exit from the stage.

While the formation of $NO_2$ is predominant at low temperatures of <400° C., preferential formation of NO takes place at higher temperatures of >400° C. or especially at T>450° C. (on this subject, see FIG. 1, which shows the mole fractions of NO and $NO_2$ in thermodynamic equilibrium at 1 bar abs proceeding from 500 ppm of NO, 500 ppm of $NO_2$, 2% by volume of $O_2$ and remainder $N_2$).

The formation of $NO_2$ resulting from reaction of $N_2O$ with NO at relatively low temperatures, according to reaction equation (1) below, becomes increasingly meaningless since $NO_2$ formed, according to reaction equation (2) below, is degraded again very rapidly to NO.

$$N_2O+NO \rightarrow NO_2+N_2 \qquad (1)$$

$$NO_2 \leftrightarrow NO+\tfrac{1}{2}O_2 \qquad (2)$$

At the exit of the $deN_2O$ stage, that degree of $NO_x$ oxidation which corresponds to the thermodynamic equilibrium is thus established at high temperatures.

This relationship is well known to those skilled in the art and is described, for example, in the aforementioned articles by Kögel et al. and Perez-Ramirez et al. According to Perez-Ramirez et al., FIG. 5a on page 215, in a water-free test gas with 1.5 mbar of $N_2O$ and 0.4 mbar of $NO_x$, in spite of intermediate formation of $NO_2$ according to reaction equation (1), an $NO/NO_2$ ratio which corresponds to the thermodynamic equilibrium position is established at temperatures of >700 K (corresponding to >427° C.), even at a high space velocity of 60 000 $h^{-1}$. In the aforementioned article by Kögel et al., FIG. 1 shows that, proceeding from a water-containing test gas containing 1000 ppm of $N_2O$ and 1000 ppm of NO, the thermodynamic $NO_x$ equilibrium is attained from 400° C. at a space velocity of 15 000 $h^{-1}$.

This means that, at the exit of a $deN_2O$ stage, at T>400° C. and pressure 1 bar abs, a degree of oxidation of <30% should be assumed, and at T>450° C. even a degree of oxidation of <20%. However, such a degree of oxidation is generally extremely unfavorable for operation of a $deNO_x$ stage.

Thus, a $deNO_x$ stage is known to function at best when the ratio of $NO/NO_2$=1/1, i.e. the degree of oxidation is approx. 50%. In this case, the person skilled in the art refers to a "fast SCR" (cf. reaction equation 3 below), which proceeds several times faster than "standard SCR" (cf. reaction equation 4 below) or "$NO_2$ SCR" (cf. reaction equation 5 below).

$$4NH_3+2NO+2NO_2 \rightarrow 4N_2+6H_2O \qquad (3)$$

$$4NH_3+4NO+O_2 \rightarrow 4N_2+6H_2O \qquad (4)$$

$$4NH_3+3NO_2 \rightarrow 3.5N_2+6H_2O \qquad (5)$$

The dependence of the reaction rate on the degree of $NO_x$ oxidation is especially important for the operation of a $deNO_x$ stage at low temperatures. This is true both in the case of use of conventional SCR catalysts, such as $V_2O_5$—$TiO_2$-based $deNO_x$ catalysts, as described, for example, by Koebel et al. in Catalysis Today 73, (2002), 239-247 (cf. FIG. 3 therein), and, for example, of $deNO_x$ catalysts based on iron zeolite.

It is evident from this that the operation of a $deNO_x$ stage at low temperatures<400° C., preferably <350° C. and especially <300° C., downstream of an $N_2O$ decomposition based on Fe zeolite catalysts, is exceptionally disadvantageous since the activity of the $NO_x$ reduction, i.e. the performance of the $deNO_x$ catalyst in the $deNO_x$ stage, is greatly impaired by the unfavorable degree of $NO_x$ oxidation.

This disadvantage can be counteracted only to a limited degree by an increase in the amount of catalyst in the $deNO_x$ stage, since disproportionately large amounts of additional catalyst would be required to achieve high degradation rates of $NO_x$ of, for example, >80% or preferably >90%, especially at high $NO_x$ inlet concentrations. This would not only put into question the economic viability of the process due to excessive capital and operating costs, but it would also be unjustifiable in many cases for technical reasons, such as space required or permissible pressure drop.

It is thus an object of the present invention to provide a process for removing $N_2O$ and $NO_x$ from offgases by catalytic decomposition of $N_2O$ by means of iron-containing zeolite catalysts and by catalytic reduction of the $NO_x$ by means of reducing agents, wherein the $deN_2O$ stage should be operated downstream of the $deN_2O$ stage at inlet temperatures of T<400° C., preferably <350° C. and especially of T<300° C., and which overcomes the abovementioned disadvantages.

It is a further object of the present invention to provide an apparatus with which the aforementioned process can be operated and which enables a simple and economically favorable establishment of the operating parameters required for the deN$_2$O stage and deNO$_x$ stage.

SUMMARY OF INVENTION

The objects stated above are achieved by passing an offgas having a selected amount of water and a selected ratio of N$_2$O to NO$_x$ through the deN$_2$O stage comprising iron zeolite catalysts. In the case of appropriate selection or establishment of the other operating parameters, the result is thus, at the outlet of the deN$_2$O stage, a higher proportion of NO$_2$ in the NO$_x$ than corresponds to the thermodynamic equilibrium. As a result, the deNO$_x$ stage which follows can be operated under conditions of a "fast SCR".

This is because, in a kinetic modeling or simulation of the NO$_x$ equilibrium and of the NO$_x$-assisted N$_2$O decomposition on iron zeolite catalysts, it has been found that, surprisingly, in the presence of large amounts of water in the offgas, or in the case of a high excess ratio of N$_2$O to NO$_x$ in the offgas, or in the case of a combination of the two factors, the position of the NO$_x$ equilibrium can be shifted or the speed of establishment of the NO$_x$ equilibrium can be reduced significantly. This means that the NO$_x$ equilibrium is firstly shifted constantly to the side of NO$_2$ by reaction of the NO with N$_2$O (according to reaction equation 1); secondly, the NO$_2$ formed as an intermediate (and any NO$_2$ present beforehand in the inlet gas stream) reacts much more slowly to give NO in the presence of appropriate amounts of water vapor than in the absence of water vapor. As a result, the establishment of the thermodynamic equilibrium position can also be delayed significantly at high temperatures, i.e. within the temperature range from 400° C. to 650° C. By adjusting the residence time in the deN$_2$O stage, i.e. by selecting the space velocity, it is thus possible to establish an operating point at which high N$_2$O degradation rates and a high degree of NO$_x$ oxidation of >30%, preferably of >40%, especially of >45%, are achieved at the same time.

As expected, there is not only an upper limit in the establishment of the space velocity arising from the minimum desired N$_2$O degradation of >80%, preferably of >90%, but surprisingly also a lower limit arising from a maximum N$_2$O degradation, which, in accordance with the invention, is <98%, preferably <97%, more preferably <95%. This means that the space velocity should have a lower limit such that a significant residue of N$_2$O always remains in the offgas at the exit of the deN$_2$O stage, which, according to reaction equation (1), results in constant formation of NO$_2$.

In interplay with the other operating parameters, the degree of oxidation of the NO$_x$ at the exit from the deN$_2$O stage, in a departure from the thermodynamic equilibrium, can be adjusted to a value of 30-70%, preferably of 40-65% and more preferably of 45-60%, such that a deNO$_x$ stage can be operated at a low temperature downstream of a deN$_2$O stage comprising Fe zeolite catalysts. The degree of NO$_x$ oxidation is defined as the ratio of the molar amount of NO$_2$ to the molar total amount of NO$_x$.

The invention relates to a process for reducing the NO$_x$ and N$_2$O contents in gases comprising NO$_x$ and N$_2$O, comprising the steps of a) passing a gas stream comprising N$_2$O, NO$_x$ and water into a deN$_2$O stage comprising an iron-laden zeolite catalyst to reduce the N$_2$O content by decomposing the N$_2$O to nitrogen and oxygen, said gas stream comprising N$_2$O, NO$_x$ and water on entry into the deN$_2$O stage having a water content between 1.0 and 10% by volume, the ratio of the molar amount of N$_2$O which enters the deN$_2$O stage to the molar amount of NO$_x$ which leaves the deN$_2$O stage being at least 1.0, or said gas stream comprising N$_2$O, NO$_x$ and water on entry into the deN$_2$O stage having a water content between 0.1 and less than 1.0% by volume, the ratio of the molar amount of N$_2$O which enters the deN$_2$O stage to the molar amount of NO$_x$ which leaves the deN$_2$O stage being at least 1.5, the temperature of the gas stream in the deN$_2$O stage having been adjusted to a value between 400° C. and 650° C., the pressure in the deN$_2$O stage having been adjusted to a value between 1 and 50 bar abs, and the space velocity in the deN$_2$O stage having been adjusted to such a value as to result in an N$_2$O degradation of 80% to 98% in the deN$_2$O stage, with the additional proviso that the degree of NO$_x$ oxidation at the outlet of the deN$_2$O stage is at least 30%, b) supplying the gas stream leaving the deN$_2$O stage to a cooling apparatus and cooling the gas stream, as it flows through this apparatus, to a temperature below 400° C., c) supplying the gas stream leaving the cooling apparatus to a deNO$_x$ stage for catalytic reduction of NO$_x$ with a reducing agent in the presence of a deNO$_x$ catalyst, with addition of such an amount of reducing agent which is sufficient to reduce the desired proportion of NO$_x$ to the gas stream, viewed in flow direction, after it leaves the deN$_2$O stage and before it flows through the deNO$_x$ catalyst.

Preferably, the ratio of the molar amount of N$_2$O which enters the deN$_2$O stage to the molar amount of NO$_x$ which leaves the deN$_2$O stage, irrespective of the water content of the offgas, is at least 1.5. Particular preference is given to N$_2$O/NO$_x$ ratios of the gas comprising N$_2$O, NO$_x$ and water of at least 2, especially of at least 5.

The N$_2$O/NO$_x$ ratio can be found by determining the molar amount or the molar concentration of N$_2$O at the inlet of the deN$_2$O stage, and by determining the molar amount or the molar concentration of NO$_x$ at the outlet of the deN$_2$O stage.

Gases suitable for the process according to the invention either already have the required ratio of N$_2$O and NO$_x$ before entry into the deN$_2$O stage, or this ratio should be established by suitable measures.

The suitable N$_2$O/NO$_x$ ratio is preferably established by chemical catalytic reduction of a portion of the NO$_x$ present in the offgas stream in the deN$_2$O stage itself. For this purpose, a proportion of reducing agent corresponding to the proportion of the NO$_x$ to be reduced is fed into the inlet gas stream to the deN$_2$O stage until the desired N$_2$O/NO$_x$ ratio has been established. The presence of the reducing agent does not significantly influence the degradation of the N$_2$O since the rate of the NO$_x$ reduction is several order of magnitude faster than the rate of N$_2$O decomposition. The amounts of reducing agent required for the establishment of the desired N$_2$O/NO$_x$ ratio depend on the type of reducing agent and on the desired amount of NO$_x$ to be degraded, and can be found by the person skilled in the art by routine experiments.

Just like the N$_2$O/NO$_x$ ratio, the water content of the gas comprising N$_2$O, NO$_x$ and water before entry to the deN$_2$O stage should also be adjusted to the inventive value by suitable measures, if the gas stream does not already contain sufficient water.

For instance, many offgases already have water contents of more than 0.1% by volume and can thus be used without any additional measures. Preferably, the water content of the gas comprising N$_2$O and NO$_x$ before entry into the deN$_2$O stage is adjusted to a value between 0.5 and 10% by volume. Particular preference is given to values between 1% by volume and 5% by volume, and very particular preference to values between 2% by volume and 5% by volume.

Experience has shown that an elevated water content, as used with preference in the process according to the invention, in the downstream deNO$_x$ stage is harmless; in other words, the performance of the deNO$_x$ stage is not significantly impaired. This is true both in the case of use of conventional SCR catalysts, for example of V$_2$O$_5$—TiO$_2$-based deNO$_x$ catalysts, and of Fe zeolite catalysts.

The water content of the gas comprising N$_2$O, NO$_x$ and water can be adjusted in various ways before entry into the deN$_2$O stage. One option is to adjust it by addition of water vapor and/or by addition of water in liquid form. In addition, the water content should preferably be adjusted by introducing the offgases from a combustion stage in which hydrogen and/or hydrogen-containing compounds are combusted. Finally, the person skilled in the art has the option of conducting the gas stream comprising N$_2$O and NO$_x$ through a loading device, which is, for example, a saturator or an absorption tower. This may be an absorption tower typically used in nitric acid plants or caprolactam plants for NO$_x$ absorption. Also possible is a combination of different measures/apparatuses for adjusting the water content. In this context, a wide variety of different parameters in the water loading apparatus, such as the predominant pressure, the temperature and the flow rate of the loading medium and of the gas comprising N$_2$O and NO$_x$, are of significance. The person skilled in the art will select such parameters on the basis of his specialist knowledge according to the water content to be established.

According to the invention, iron-laden zeolite catalysts are used in the deN$_2$O stage. These are preferably zeolites selected from the group of the MFI, BEA, FER, MOR and MEL types, or mixtures thereof, preferably of the BEA or MFI type, more preferably a ZSM-5 zeolite. It is important that the zeolites used have a high hydrothermal stability. This property is a feature especially of the "high silica" zeolites, which are thus particularly preferred.

Specific details regarding the makeup or structure of the zeolites used with preference in accordance with the invention are given in the Atlas of Zeolite Structure Types, Elsevier, 4th revised Edition 1996, which is hereby explicitly incorporated by reference.

The process according to the invention also includes the use of those zeolites in which some of the lattice aluminum has been replaced by one or more elements selected from B, Be, Ga, Fe, Cr, V, As, Sb and Bi. Likewise included is the use of zeolites in which the lattice silicon has been replaced isomorphously by one or more elements, for example by one or more elements selected from Ge, Ti, Zr and Hf.

Most preferably, catalysts which have been treated with water vapor ("steamed" catalysts) are used in the deN$_2$O stage. Such a treatment dealuminates the lattice of the zeolite; this treatment is known per se to those skilled in the art. Preference is given to using hydrothermally treated zeolite catalysts in the deN$_2$O stage which have been laden with iron, and in which the ratio of extra-lattice aluminum to lattice aluminum is at least 1:2, preferably 1:2 to 20:1.

Catalysts used in accordance with the invention typically comprise further additives known to those skilled in the art, for example binders, for example aluminosilicates or boehmite. Catalysts used in accordance with the invention are based preferably on zeolites into which iron has been introduced by solid-state ion exchange. Typically, the starting materials for this purpose are the commercially available ammonium zeolites (e.g. NH$_4$-ZSM-5) and the appropriate iron salts (e.g. FeSO$_4$×7 H$_2$O), and these are mixed vigorously in a mechanical manner in a ball mill at room temperature (Turek et al.; Appl. Catal. 1984, (1999) 249-256; EP-A-0 955 080). These references are hereby explicitly incorporated by reference. The catalyst powders obtained are subsequently calcined in a chamber furnace under air at temperatures in the range from 400° C. to 650° C. After the calcination, the iron-containing zeolites are washed vigorously in distilled water and, after filtering off the zeolite, dried. Finally, the suitable binders are added to and mixed with the iron-containing zeolites thus obtained and extruded, for example, to cylindrical catalyst bodies.

The catalyst may be present as a shaped body of any size and geometry, preferably in geometries which have a large ratio of surface area to volume, and which generate a minimum pressure drop in the course of flow through them.

Typical geometries are all of those known in catalysis, for example cylinders, hollow cylinders, multihole cylinders, rings, crushed pellets, trilobes or honeycomb structures.

The iron content of the iron-containing zeolites used in the deN$_2$O stage may vary within wide ranges based on the mass of zeolite, for example be up to 25%, but preferably be 0.1 to 10%, and especially 2 to 7%.

In the deN$_2$O stage, the temperature in the process according to the invention varies within the range from 400 to 650° C., preferably from 425 to 600° C. and especially from 450 to 550° C.

In the deN$_2$O stage, the pressure in the process according to the invention varies within the range from 1 to 50 bar abs, preferably 1 to 25 bar abs, more preferably 4 to 15 bar abs. A higher operating pressure in the deN$_2$O stage reduces the amount of catalyst required for N$_2$O decomposition. An elevated pressure under otherwise identical operating parameters leads to a higher degree of NO$_x$ oxidation at the outlet of the deN$_2$O stage.

The amount of catalyst in the deN$_2$O stage must be such that the desired degree of N$_2$O degradation is achieved, which in turn affects the desired degree of NO$_x$ oxidation at the outlet of this stage.

The reactor bed of the deN$_2$O stage is preferably filled with catalysts such that based on the entering gas stream the result in each case is a space velocity of between 2000 and 50 000 h$^{-1}$, preferably a space velocity of between 2500 and 25 000 h$^{-1}$, and more preferably a space velocity of between 3000 and 20 000 h$^{-1}$, and most preferably a space velocity of between 4000 and 15 000 h$^{-1}$. In the context of this description, the term "space velocity" is understood to mean the quotient of parts by volume of gas mixture (measured at 273.15 K and 1.01325 bara) per hour based on one part by volume of catalyst. The space velocity can thus be adjusted via the volume flow rate of the gas and/or via the amount of catalyst.

In the process according to the invention, the process parameters in the deN$_2$O stage, i.e. space velocity, temperature and pressure, are selected within the above-specified ranges for these process parameters so as to result in, for a gas with a given water content and ratio of N$_2$O and NO$_x$ at the outlet of the deN$_2$O stage, an N$_2$O conversion between 80% and 98%, preferably between 85% and 97%, and most preferably between 90% and 95%. Full degradation of the N$_2$O should not take place. Operation of the deN$_2$O stage under these conditions ensures that, at the outlet of this stage, the desired degree of NO$_x$ oxidation is present, such that the downstream deNO$_x$ stage can be operated with the desired efficiency in spite of lower operating temperatures.

In a preferred embodiment of the invention, the gas comprising N$_2$O, NO$_x$ and water, before it enters the deN$_2$O stage, is heated by means of a heating apparatus, especially by means of a heat exchanger, to a temperature between 400° C. and 650° C. The heating apparatuses usable also include electrical heaters or burners of any kind, especially catalytic burners. Burners offer an additional means of regulating the water content in the gas comprising $N_2O$ and $NO_x$.

To remove the $NO_x$ in the downstream $deNO_x$ stage, the gas stream, after it leaves the $deN_2O$ stage, must be cooled since the $deNO_x$ stage is operated at lower temperatures. For this purpose, it is possible to use any cooling apparatuses known to those skilled in the art. The person skilled in the art preferably selects cooling apparatuses which permit the recovery of a portion of the heat withdrawn from the offgas stream, for example heat exchangers.

Advantageously, the resulting gas stream from the $deN_2O$ stage is supplied to a cooling apparatus which permits the transfer of the heat released to the gas comprising $N_2O$, $NO_x$ and water before it enters the $deN_2O$ stage, this gas being heatable to a temperature between 400° C. and 650° C. Very particular preference is given to using a recuperator for this purpose.

In a further preferred configuration of the invention, the heat exchanger is bypassed, such that a substream of the gas comprising $N_2O$, $NO_x$ and water, or optionally even the entire gas stream, can be conducted past the heat exchanger. In this case, the amount of this (sub)stream is regulated by means of a valve. Thus, the temperature at the inlet into the $deN_2O$ stage can also be adjusted in different modes of the plant in order to obtain the $N_2O$ conversion which is optimal for the downstream $deNO_x$ stage and hence the optimal degree of $NO_x$ oxidation. Preferably, the resulting gas stream, before entry into the $deN_2O$ stage, is supplied to a heating apparatus, which is especially a burner, and heated further by the latter before entry into the $deN_2O$ stage, optionally with supply of water vapor.

In the case of operation of the process according to the invention in combination with some plants, for example with caprolactam plants, particular measures may be required for protection of the catalyst used in the $deN_2O$ stage. In caprolactam plants, the absorption tower is frequently operated with a phosphate-containing buffer solution as an absorbent for the $NO_x$. In this case, it is possible that droplets of the absorbent are entrained by the residual gas stream which is to be cleaned by the process according to the invention. This results in the risk that entrained phosphoric acid or phosphates can be deposited on the downstream apparatuses, and also in the inventive system. There is thus the possibility of deactivation particularly of the catalyst of the $deN_2O$ stage. In order to counter this risk, in a preferred embodiment, a guard bed consisting of random packings or structured packings of shaped bodies comprising alumina is connected upstream of the $deN_2O$ stage. This guard bed binds the phosphoric acid or salts thereof and protects the iron zeolite catalyst of the $deN_2O$ stage. This bed preferably consists of porous alumina pellets, for example an annular extrudate. The protective effect is ensured by the fact that alumina reacts with phosphoric acid or the corresponding ammonium salts of phosphoric acid to give aluminum phosphate, which is stable under the prevailing operating conditions.

In the region between the exit of the gas from the $deN_2O$ stage and up to directly upstream of the catalyst bed of the $deNO_x$ stage, the $N_2O$-depleted gas is mixed with a reducing agent for $NO_x$. This may be any substance which is known to those skilled in the art and has a high activity for reduction of $NO_x$. This may, for example, be a nitrogen-containing reducing agent. The nitrogen-containing reducing agents employed may be any compounds provided that they are suitable for reduction of $NO_x$. Examples are azanes, hydroxyl derivatives of azanes, and also amines, oximes, carbamates, urea or urea derivatives. Examples of azanes are hydrazine and very particularly ammonia. One example of a hydroxyl derivative of azanes is hydroxylamine. Examples of amines are primary aliphatic amines, such as methylamine. One example of carbamates is ammonium carbamate. Examples of urea derivatives are N,N'-substituted ureas, such as N,N'-dimethylurea. Ureas and urea derivatives are preferably used in the form of aqueous solutions.

Particular preference is given to using ammonia as a reducing agent for $NO_x$.

The reducing agent is added in such amounts as required for reduction of the $NO_x$ to the desired degree in the $deNO_x$ stage. The aim is a reduction in the $NO_x$ content by >80%, preferably >90%, even more preferably >95%, especially between 95% and 100%. The amounts of reducing agent required for that purpose depend on the type of reducing agent and can be determined by the person skilled in the art by routine experiments.

In the case of ammonia as a reducing agent for $NO_x$, typically 0.8 to 1.5, preferably 0.9 to 1.4 and more preferably 1.0 to 1.2 molar parts of ammonia are used, based on the molar proportion of $NO_x$ to be reduced.

The way in which the reducing agents are introduced into the gas stream to be treated can be configured freely in the context of the invention. The reducing agent can be introduced in the form of a gas or else of a liquid or aqueous solution which evaporates in the gas stream to be treated. The feeding into the gas stream to be treated is effected through a suitable introduction apparatus, for example through an appropriate pressure valve or through appropriately configured nozzles. Preferably, a mixer can be provided downstream of the introduction apparatus in the line for the gas stream to be treated, and promotes the mixing of the gas stream to be cleaned with the reducing agent supplied. In the case of use of different reducing agents, supply and introduction into the gas to be cleaned may be separate or together.

The reducing agent is introduced, in flow direction, upstream of the $deNO_x$ stage or upstream of the catalyst bed of the $deNO_x$ stage and downstream of the $deN_2O$ stage.

In the process variant in which a portion of the $NO_x$ present is to be degraded as early as in the $deN_2O$ stage in order to establish the desired $N_2O/NO_x$ ratio in the $deN_2O$ stage, the reducing agent is additionally introduced, in flow direction, upstream of the $deN_2O$ stage or upstream of the (first) catalyst bed of the $deN_2O$ stage.

In the $deNO_x$ stage, $deNO_x$ catalysts which promote the chemical reaction of $NO_x$ with reducing agents, and the performance of which depends on the degree of $NO_x$ oxidation of the entering gas stream, are used. Preference is given to conventional $deNO_x$ catalysts (SCR catalysts), especially those comprising transition metals and/or transition metal oxides, for example oxides of iron, nickel, copper, cobalt, manganese, rhodium, rhenium or vanadium, or metallic platinum, gold or palladium, or else mixtures of two or more of these compounds. Particular preference is given to using catalysts based on $V_2O_5$—$TiO_2$, or zeolite-based catalysts, especially copper- or iron-laden zeolites.

Like the $deN_2O$ catalysts, the $deNO_x$ catalysts may also be present as shaped bodies of any size and geometry, and may have the preferred geometries mentioned for the $deN_2O$ catalysts.

The design of the catalyst beds in the $deN_2O$ and $deNO_x$ stage can be configured freely. These may be present, for example, in the form of a tubular reactor with axial flow or of a radial basket reactor with radial flow, or of a lateral flow reactor. It is also possible for several catalyst beds in series to be present in one stage.

In the deNO$_x$ stage, the temperature in the process according to the invention is less than 400° C., preferably between 180 and 380° C., more preferably between 200 and 350° C. and especially preferably between 200 and 300° C.

In the deNO$_x$ stage, the pressure in the process according to the invention varies within the range from 1 to 50 bar abs, preferably 1 to 25 bar abs, more preferably 4 to 15 bar abs. A higher operating pressure in the deNO$_x$ stage reduces the amount of catalyst required for NO$_x$ reduction. An elevated pressure with otherwise identical operating parameters generally leads to increased degradation of NO$_x$ at the outlet of the deNO$_x$ stage.

The reactor bed of the deNO$_x$ stage is preferably filled with catalyst so as to result in each case in a space velocity based on the entering gas stream which brings about a reduction in the NO$_x$ content present at the inlet to this stage of at least 80% under the given temperature and pressure values in this stage. Typical space velocities in the deNO$_x$ stage vary within the range between 2000 and 200 000 h$^{-1}$, preferably between 5000 and 100 000 h$^{-1}$ and more preferably between 10 000 and 50 000 h$^{-1}$. The space velocity can, as in the deN$_2$O stage too, be established via the volume flow of the gas and/or via the amount of catalyst.

In the process according to the invention, the process parameters in the deNO$_x$ stage, i.e. space velocity, temperature and pressure, are selected within the above-specified ranges for these process parameters so as to result in, for a gas with a given degree of NO$_x$ oxidation and in the case of appropriate addition of reducing agent for NO$_x$, a reduction in the amount of NO$_x$ of at least 80% at the outlet of the deNO$_x$ stage.

The invention also relates to a specially configured apparatus which can be used especially for performance of the process according to the invention.

This is an apparatus for reducing the NO$_x$ and N$_2$O contents in gases comprising NO$_x$, N$_2$O and water, comprising the elements:

A) an apparatus (2) for adjusting the water content of the gas stream (1) comprising NO$_x$ and N$_2$O,
B) a deN$_2$O stage (3) arranged downstream of apparatus (2) for reducing the N$_2$O content of the gas stream comprising an iron-laden zeolite catalyst,
C) a cooling apparatus (4) arranged downstream of the deN$_2$O stage (3) for cooling the gas stream (5) leaving the deN$_2$O stage,
D) a deNO$_x$ stage (6) arranged downstream of the cooling apparatus (4) and comprising a deNO$_x$ catalyst for reducing the NO$_x$ content of the gas stream, and
E) a feed line (7) for introducing reducing agent for NO$_x$ into the gas stream (5) leaving the deN$_2$O stage, which is arranged between the outlet of the deN$_2$O stage (3) and upstream of the deNO$_x$ catalyst of the deNO$_x$ stage (6).

In a preferred variant, the inventive apparatus comprises a cooling apparatus (4) for the gas stream (5) leaving the deN$_2$O stage which is thermally coupled to a heating apparatus (8) for the gas stream (1) comprising N$_2$O, NO$_x$ and water, for the purpose of heating this gas stream (1) before it enters the deN$_2$O stage (3) and for the purpose of cooling the gas stream (5) leaving the deN$_2$O stage before it enters the deNO$_x$ stage (6). This is preferably a heat exchanger and most preferably a recuperator.

In a further preferred variant, the inventive apparatus comprises an apparatus for adjusting the water content of the gas stream (1) comprising NO$_x$, N$_2$O and water, which is a burner (9) in which combustion gas (10) comprising hydrogen and/or hydrogen-containing compounds is incinerated together with oxygen-containing gas (11), especially air, and the offgases (12) thereof are introduced into the feed line of the gas stream (1) comprising NO$_x$, N$_2$O and water to the deN$_2$O stage.

In a further particularly preferred variant, the inventive apparatus comprises a bypass (13) provided upstream of the heating apparatus (8) in the feed line for the gas stream (1) comprising N$_2$O, NO$_x$ and water, with which a portion of the gas stream (1) or the entire gas stream (1) can be introduced directly into the deN$_2$O stage (3), said bypass (13) being provided with a valve (14) with which the proportion of the gas stream (1) passing through the heating apparatus (8) can be controlled, or can be regulated as a function of the temperature of the gas stream entering the deN$_2$O stage.

Yet a further particularly preferred variant relates to an inventive apparatus in which a feed line (7) arranged directly upstream of the catalyst of the deNO$_x$ stage (6) is provided for introduction of reducing agent for NO$_x$ into the gas stream (5) leaving the deN$_2$O stage (3), preference being given to providing a mixer in the feed line of the gas stream into the deNO$_x$ stage downstream of the feed line (7).

Yet a further particularly preferred variant relates to an inventive apparatus in which a feed line (17) arranged directly upstream of the catalyst of the deN$_2$O stage (3) is provided for introduction of reducing agent for NO$_x$ into the gas stream (1) comprising N$_2$O, NO$_x$ and water, preference being given to providing a mixer in the feed line of the gas stream into the deN$_2$O stage downstream of the feed line (17).

The inventive plant is designed such that the at least one catalyst of the deN$_2$O stage is an iron-laden zeolite. The zeolites are preferably of the MFI, BEA, FER, MOR and/or MEL type, and more preferably ZSM-5.

Preference is given to an apparatus in which a guard bed connected upstream of the iron-laden zeolite catalyst of the deN$_2$O stage (3) consists of a structured packing or bed of alumina-containing shaped bodies.

Preference is likewise given to an apparatus in which the deNO$_x$ catalyst in the deNO$_x$ stage (6) is a transition metal-containing SCR catalyst or an iron- or copper-laden zeolite catalyst, especially an SCR catalyst based on V$_2$O$_5$—TiO$_2$.

Still further features and advantages of the invention will become apparent from the discussion which follows.

BRIEF DESCRIPTION OF DRAWINGS

The invention is described in detail above and below in connection with numerous examples and in connection with the attached Figures. In the Figures.

DETAILED DESCRIPTION

Figure 1:
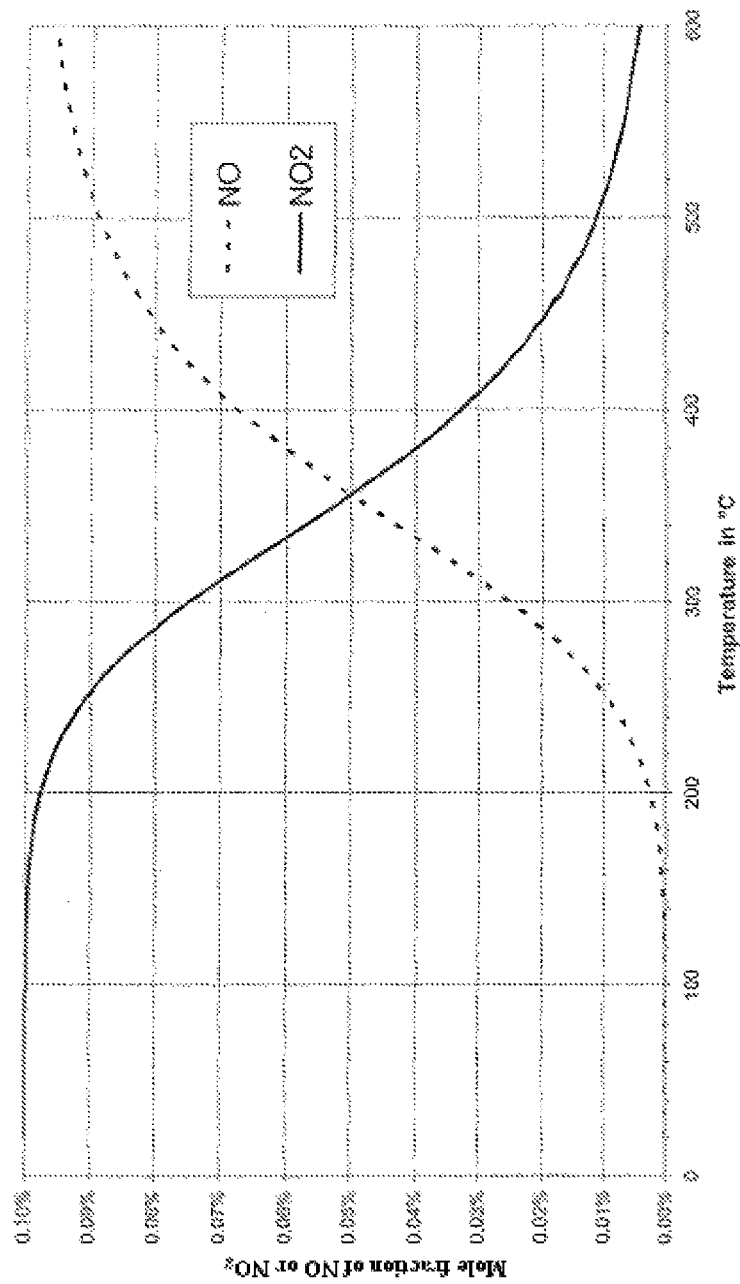
FIG. 1 is a graph illustrating the mole fractions of NO and NO$_2$ in thermodynamic equilibrium at 1 bar abs proceeding from 500 ppm of NO, 500 ppm of NO$_2$, 2% by volume of O$_2$ and remainder N$_2$.
Figure 2:
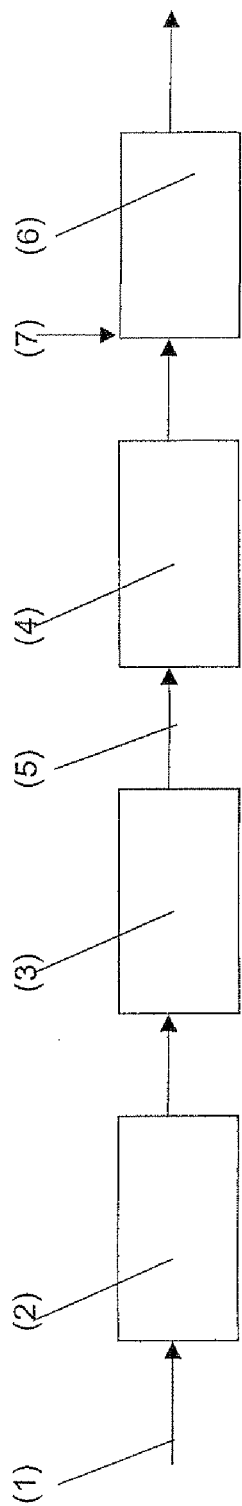
FIG. 2 is a schematic diagram of the process according to the invention and of the plant for reducing the content of NO$_x$ and N$_2$O in gases, such as process gases or offgases.
Figure 3:
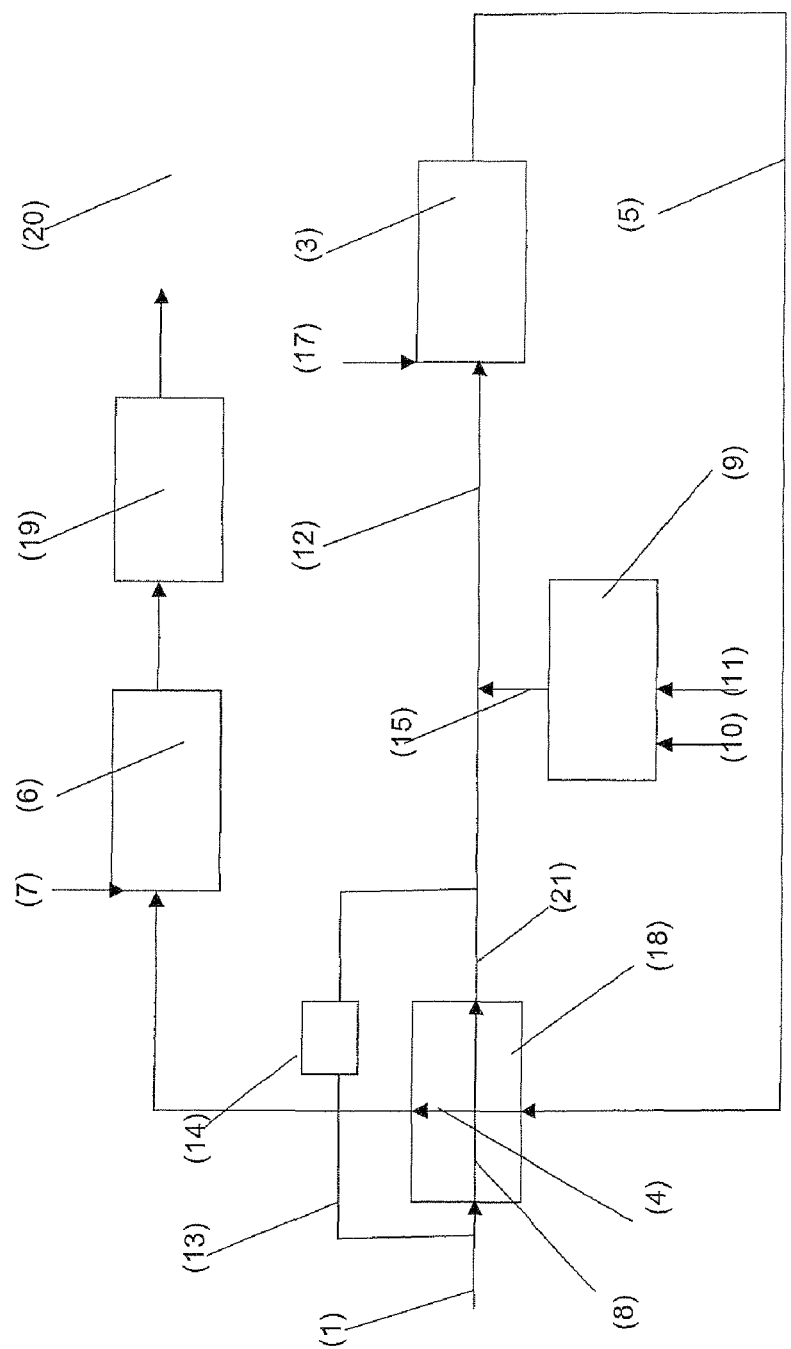
FIG. 3 is a schematic diagram of a preferred variant of the process according to the invention and of the inventive plant.

The inventive system will be explained in detail by way of example hereinafter with reference to two figures, without any intention of a restriction thereby. The figures show:

FIG. 2: an outline of the process according to the invention and of the plant for reducing the content of $NO_x$ and $N_2O$ in gases, such as process gases or offgases;

FIG. 3: a preferred variant of the process according to the invention and of the inventive plant.

FIG. 2 shows an outline of the process according to the invention/of the apparatus according to the invention. What is shown is an apparatus (2) for adjusting the water content of the gas (1) comprising $NO_x$ and $N_2O$. The water-laden offgas then enters a $deN_2O$ stage (3) which comprises an iron-laden zeolite catalyst. After passing through the $deN_2O$ stage (3), the gas stream (5) is passed through a cooling apparatus (4) and then enters a $deNO_x$ stage (6) and subsequently leaves the inventive cleaning plant. At the start of the $deNO_x$ stage (6), a feed line (7) is provided for introduction of reducing agent for $NO_x$ into the gas stream (5) leaving the $deN_2O$ stage (3). In the outline, this feed line (7) is arranged immediately upstream of the $deNO_x$ stage (6); it may also be arranged in the region between the outlet of the $deN_2O$ stage (3) and the position shown in FIG. 2. This feed line (7) may also open into the $deNO_x$ stage (6) itself, but upstream of the entry of the gas stream into the catalyst bed of the $deNO_x$ stage (6).

FIG. 3 shows an outline of a preferred variant of the inventive system. A gas stream (1) comprising $NO_x$ and $N_2O$ is passed into a heat exchanger (18). Heat is supplied to the gas stream (1) therein, resulting in a heated gas stream (21). A substream (13) of the gas stream (1) can bypass the heat exchanger (18) and is subsequently introduced together with the other substream of the gas stream (1) and with an offgas stream (15) from a burner (9) into a $deN_2O$ stage (3). In burner (9), air (11) and hydrogen as combustion gas (10) are combusted. The hot offgas (15) heats the gas stream (1) further, and the water content in this gas stream (1) is also increased. The latter subsequently passes, as gas stream (12), into the $deN_2O$ stage (3) which comprises an iron-containing zeolite preferably surrounded by an $Al_2O_3$ bed. The $Al_2O_3$ bed protects the iron-containing zeolite from, for example, phosphate which may additionally be present in the gas stream. At the start of the $deN_2O$ stage (3) is a feed line (17) for introduction of $NH_3$, which serves as a reducing agent for partial degradation of the $NO_x$ present in gas stream (12), which establishes an optimal $N_2O/NO_x$ ratio. The gas stream (5) leaving the $deN_2O$ stage (3), which has an optimal degree of $NO_x$ oxidation of approximately $NO:NO_2=1:1$, is then passed through the heat exchanger (18) for heat exchange. At the same time, the gas stream releases the stored heat in the cooling apparatus (4) (here: part of the heat exchanger (18)) to the gas stream (1) which comprises $NO_x$ and $N_2O$ and is to be heated, and is itself cooled. In the next cleaning step, the gas stream thus cooled passes through the $deNO_x$ stage (6), into which $NH_3$ is introduced through line (7) in addition to the $NO_x$ degradation. The gas stream which has thus been depleted of $N_2O$ and $NO_x$ leaves the unit (6), is passed into a turbine (19) and is then released to the environment (20).

In order to ensure optimal startup of the inventive apparatus, the substream (13) is provided in this illustrative embodiment. The volume of this substream can be controlled via the valve (14). This can ensure that the $deN_2O$ stage (3) in particular is brought to the temperature of the $NO_x$- and $N_2O$-containing residual gas stream (1) within a short time. This eliminates the sluggishness of the system during startup.

In the case of startup from the cold state, the valve (14) is thus opened such that a substream bypasses the heat exchanger (18). As soon as a sufficient exit temperature of the $deN_2O$ stage (3) has been attained, the burner (9) is lit in order to further raise the temperature of the gas stream to be cleaned in the $deN_2O$ stage (3). The water concentration in the gas stream (12) also increases as a result of the supply of the offgas (15). When the optimal operating conditions for the $deN_2O$ stage (3) have been attained, the valve (14) is closed and the bypassing of the heat exchanger (18) by the substream (13) is prevented. During operation, the opening of the valve (14) can also be adjusted so as to result in an optimal combination of inlet temperature and water content in the $deN_2O$ stage.

In the case of restart of the inventive plant after a brief shutdown, which means that the plant is still in the warm state, the valve (14) is closed and the entire volume flow of the $NO_x$- and $N_2O$-containing residual gas stream (1) passes through the heat exchanger (18). In this case, the burner (9) is lit immediately since the temperature in the $deN_2O$ stage (3) is already sufficiently high from the start. The water concentration increases in accordance with the water content of the offgas (15). The inlet temperature of the $deN_2O$ stage (3) rises further due to the preheating in the heat exchanger (18) and in the burner (9) until the normal operating temperature has been attained.

In addition, the control of the volume of the substream (13) can allow optimal partial load operation to be ensured. Without the possibility of bypassing the heat exchanger (18), the temperature of the gas stream (1) would be too high in partial load operation, since the size of the heat exchanger (18) would be excessive. The burner output would have to be throttled, the energy recovery in the turbine (19) would become less, and $NO_x$ slippage would additionally increase, which would be released to the environment. These are disadvantages which are eliminated by the system described by way of example here, by reducing the area of the heat exchanger (18) in operation with the substream (13).

The invention is illustrated by the examples which follow in tables 1 and 2. The data reproduced result from a kinetic simulation of the $NO_x$-assisted $N_2O$ decomposition and of the $NO_x$ equilibrium with the aid of the "Presto Kinetics" software from CiT GmbH for a catalyst bed of cylindrical pellets of Fe-ZSM-5 (diameter 2.6 mm, length 5.7 mm) in a flow tube reactor with axial flow. The reactor model used was developed on the basis of laboratory tests and verified by studies in a Mini-Plant, operated with the abovementioned catalyst extrudates on the liter scale.

TABLE 1

| Example | 1a | 1b | 1c | 1d | 1e | 2 | 3 | 4a |
|---|---|---|---|---|---|---|---|---|
| P in bar abs | 1 | 1 | 1 | 1 | 1 | 1 | 1 | 1 |
| T in ° C. | 480 | 480 | 480 | 480 | 480 | 480 | 480 | 480 |
| $[N_2O]_{in}$ in ppm | 2000 | 2000 | 2000 | 2000 | 2000 | 2000 | 2000 | 2000 |
| $[NO]_{in}$ in ppm | 100 | 100 | 100 | 100 | 100 | — | 200 | 500 |
| $[NO_2]_{in}$ in ppm | 100 | 100 | 100 | 100 | 100 | 200 | — | 500 |
| $[NO_x]_{out}$ in ppm | 200 | 200 | 200 | 200 | 200 | 200 | 200 | 1000 |

TABLE 1-continued

| [$H_2O$]$_{in}$ in % vol | 3 | 3 | 3 | 3 | 3 | 3 | 3 | 3 |
|---|---|---|---|---|---|---|---|---|
| [$O_2$]$_{in}$ in % vol | 3 | 3 | 3 | 3 | 3 | 3 | 3 | 3 |
| [$N_2$]$_{in}$ in % vol | remainder | remainder | remainder | remainder | remainder | remainder | remainder | remainder |
| Space velocity in $1000 \times h^{-1}$ | 6.1 | 5.2 | 4.6 | 3.9 | 3.0 | 4.5 | 4.7 | 9.8 |
| $N_2O$ degradation | 85% | 90% | 93% | 96% | 99% | 93% | 93% | 80% |
| Degree of $NO_x$ oxidation at the inlet | 50% | 50% | 50% | 50% | 50% | 100% | 0% | 50% |
| Degree of $NO_x$ oxidation at the outlet | 55.0% | 46.4% | 40% | 32.1% | 21.8% | 40% | 40% | 38.6% |
| Degree of $NO_x$ oxidation at equilibrium | 16.5% | 16.5% | 16.5% | 16.5% | 16.5% | 16.5% | 16.5% | 16.5% |

| Example | 4b | 4c | 5a | 5b | 5c |
|---|---|---|---|---|---|
| P in bar abs | 1 | 1 | 5 | 5 | 5 |
| T in ° C. | 480 | 480 | 480 | 480 | 480 |
| [$N_2O$]$_{in}$ in ppm | 2000 | 2000 | 2000 | 2000 | 2000 |
| [NO]$_{in}$ in ppm | 500 | 500 | 500 | 500 | 500 |
| [$NO_2$]$_{in}$ in ppm | 500 | 500 | 500 | 500 | 500 |
| [$NO_x$]$_{out}$ in ppm | 1000 | 1000 | 1000 | 1000 | 1000 |
| [$H_2O$]$_{in}$ in % vol | 3 | 3 | 3 | 3 | 3 |
| [$O_2$]$_{in}$ in % vol | 3 | 3 | 3 | 3 | 3 |
| [$N_2$]$_{in}$ in % vol | remainder | remainder | remainder | remainder | remainder |
| Space velocity in $1000 \times h^{-1}$ | 8.3 | 1.0 | 14.2 | 12.4 | 8.6 |
| $N_2O$ degradation | 85% | 90% | 90% | 93% | 98% |
| Degree of $NO_x$ oxidation at the inlet | 50% | 50% | 50% | 50% | 50% |
| Degree of $NO_x$ oxidation at the outlet | 34.9% | 30.5% | 44.4% | 41.4% | 34.9% |
| Degree of $NO_x$ oxidation at equilibrium | 16.5% | 16.5% | 30.6% | 30.6% | 30.6% |

TABLE 2

| Example | 6a | 6b | 7a | 7b | 8a | 8b | 9a | 9b |
|---|---|---|---|---|---|---|---|---|
| P in bar abs | 1 | 1 | 1 | 1 | 1 | 1 | 1 | 1 |
| T in ° C. | 480 | 480 | 480 | 480 | 480 | 480 | 480 | 480 |
| [$N_2O$]$_{in}$ in ppm | 1000 | 1000 | 1000 | 1000 | 1000 | 1000 | 1000 | 1000 |
| [NO]$_{in}$ in ppm | 500 | 500 | 1000 | 1000 | — | — | 500 | 500 |
| [$NO_2$]$_{in}$ in ppm | 500 | 500 | — | — | 1000 | 1000 | 500 | 500 |
| [$NO_x$]$_{out}$ in ppm | 1000 | 1000 | 1000 | 1000 | 1000 | 1000 | 1000 | 1000 |
| [$H_2O$]$_{in}$ in % vol | 0.3 | 0.3 | 0.3 | 0.3 | 0.3 | 0.3 | 3 | 3 |
| [$O_2$]$_{in}$ in % vol | 3 | 3 | 3 | 3 | 3 | 3 | 3 | 3 |
| [$N_2$]$_{in}$ in % vol | remainder | remainder | remainder | remainder | remainder | remainder | remainder | remainder |
| Space velocity in $1000 \times h^{-1}$ | 11.8 | 10.3 | 11.8 | 10.3 | 11.6 | 10.1 | 10.1 | 8.6 |
| $N_2O$ degradation | 90% | 93% | 90% | 93% | 90% | 93% | 80% | 85% |
| Degree of $NO_x$ oxidation at the inlet | 50% | 50% | 0% | 0% | 100% | 100% | 50% | 50% |
| Degree of $NO_x$ oxidation at the outlet | 23.2% | 21.5% | 19.8% | 19.2% | 26.7% | 23.9% | 30.3% | 27.7% |
| Degree of $NO_x$ oxidation at equilibrium | 16.5% | 16.5% | 16.5% | 16.5% | 16.5% | 16.5% | 16.5% | 16.5% |

| Example | 9c | 10a | 10b | 10c | 11a | 11b |
|---|---|---|---|---|---|---|
| P in bar abs | 1 | 1 | 1 | 1 | 1 | 1 |
| T in ° C. | 480 | 480 | 480 | 480 | 430 | 430 |
| [$N_2O$]$_{in}$ in ppm | 1000 | 2000 | 2000 | 2000 | 1000 | 1000 |
| [NO]$_{in}$ in ppm | 500 | 100 | 100 | 100 | 100 | 100 |

TABLE 2-continued

|  |  |  |  |  |  |  |
|---|---|---|---|---|---|---|
| $[NO_2]_{in}$ in ppm | 500 | 100 | 100 | 100 | 100 | 100 |
| $[NO_x]_{out}$ in ppm | 1000 | 200 | 200 | 200 | 200 | 200 |
| $[H_2O]_{in}$ in % vol | 3 | 0.3 | 0.3 | 0.3 | 1 | 1 |
| $[O_2]_{in}$ in % vol | 3 | 3 | 3 | 3 | 3 | 3 |
| $[N_2]_{in}$ in % vol | remainder | remainder | remainder | remainder | remainder | remainder |
| Space velocity in $1000 \times h^{-1}$ | 6.3 | 9.1 | 8.0 | 5.8 | 2.6 | 3.0 |
| $N_2O$ degradation | 93% | 90% | 93% | 96% | 85% | 80% |
| Degree of $NO_x$ oxidation at the inlet | 50% | 50% | 50% | 50% | 50% | 50% |
| Degree of $NO_x$ oxidation at the outlet | 22.9% | 40.5% | 35.0% | 28.7% | 36.7% | 39.2% |
| Degree of $NO_x$ oxidation at equilibrium | 16.5% | 16.5% | 16.5% | 16.5% | 27.6% | 27.6% |

As evident in examples 1a-1d, inventive adjustment of the operating parameters of the deN$_2$O stage, especially of an N$_2$O/NO$_x$ ratio of 2000/200=10, a water content of 3% by volume and suitable selection of the space velocity at the exit of the deN$_2$O stage, allows establishment of a degree of NO$_x$ oxidation which differs significantly from the thermodynamic equilibrium position (of only 16.5%) and, in accordance with the invention, approaches the theoretical optimum of 50%.

When the space velocity, as shown in noninventive example 1e, is lowered to such an extent that the N$_2$O degradation is 99%, the degree of NO$_x$ oxidation is only 21.8%, which would mean an inadequate starting position for operation of a downstream deNO$_x$ stage.

The attainment of the desired degree of NO$_x$ oxidation at the exit of the deN$_2$O stage depends, in a first approximation, on the degree of oxidation at the inlet of the deN$_2$O stage, as shown in examples 2 and 3.

Examples 5a-c show the positive influence of an increased operating pressure on the degree of NO$_x$ oxidation.

The high water content of 3% by volume has a positive effect in accordance with the invention, as shown by a comparison of examples 1b-1d with examples 10a-10c. At a water content of 0.3% by volume, the N$_2$O conversion here should be limited to less than 96% in order to achieve a degree of NO$_x$ oxidation of about 30%.

The lowering of the N$_2$O/NO$_x$ ratio to a value of 2 under otherwise identical conditions in examples 4a-4c shows the influence of the N$_2$O/NO$_x$ ratio, which, however, with a value of 2 is also still sufficient to achieve the inventive shift in the degree of NO$_x$ oxidation.

If, in contrast, an N$_2$O/NO$_x$ ratio of 1 is established (examples 6-9), the inventive effect can be achieved only when the input gas has a sufficiently high water content and, at the same time, a sufficiently high space velocity is established, such that a sufficiently low N$_2$O conversion is attained (ex. 9a). In noninventive examples 9b and 9c, the space velocity is not high enough, or the N$_2$O conversion achieved is too high and the desired degree of NO$_x$ oxidation is not attained.

The invention claimed is:

1. A process for reducing the NO$_x$ and N$_2$O contents in gases comprising NO$_x$ and N$_2$O, comprising the steps of
   a) passing a gas stream comprising N$_2$O, NO$_x$ and water into a deN$_2$O stage comprising an iron-laden zeolite catalyst to reduce the N$_2$O content by decomposing the N$_2$O to nitrogen and oxygen, such that said gas stream entering the deN$_2$O stage and a gas stream exiting the deN$_2$O stage are characterized by compositional requirements selected from (i) or (ii):
   (i) the gas stream entering the deN$_2$O stage has a water content between 1.0 and 10% by volume and the ratio of the molar amount of N$_2$O in the gas stream entering the deN$_2$O stage to the molar amount of NO$_x$ in the gas stream exiting the deN$_2$O stage (N$_2$O/NO$_x$) is at least 1.0; or
   (ii) the gas stream entering the deN$_2$O stage has a water content between 0.1 and less than 1.0% by volume and the ratio of the molar amount of N$_2$O in the gas stream entering the deN$_2$O stage to the molar amount of NO$_x$ in the gas stream exiting the deN$_2$O stage (N$_2$O/NO$_x$) is at least 1.5;
   wherein the temperature of the gas stream in the deN$_2$O stage having been adjusted to a value between 400° C. and 650° C., the pressure in the deN$_2$O stage having been adjusted to a value between 1 and 50 bar abs, and the space velocity in the deN$_2$O stage having been adjusted to such a value as to result in an N$_2$O degradation of 80% to 98% in the deN$_2$O stage, with the additional proviso that the degree of NO$_x$ oxidation at the outlet of the deN$_2$O stage is at least 30%,
   b) supplying the gas stream leaving the deN$_2$O stage to a cooling apparatus and cooling the gas stream, as it flows through this apparatus, to a temperature below 400° C., and
   c) supplying the gas stream leaving the cooling apparatus to a deNO$_x$ stage for catalytic reduction of NO$_x$ with a reducing agent in the presence of a deNO$_x$ catalyst, with addition of such an amount of reducing agent which is sufficient to reduce the desired proportion of NO$_x$ to the gas stream, viewed in flow direction, after it leaves the deN$_2$O stage and before it flows through the deNO$_x$ catalyst.

2. The process as claimed in claim 1, wherein the ratio of the molar amount of N$_2$O which enters the deN$_2$O stage to the molar amount of NO$_x$ which leaves the deN$_2$O stage is at least 1.5.

3. The process as claimed in claim 1, wherein the molar ratio of N$_2$O and NO$_x$ in the gas stream comprising NO$_x$, N$_2$O and water, even before it enters the deN$_2$O stage, is at least 1.5, or wherein a reducing agent for NO$_x$ is added to the gas stream comprising NO$_x$, N$_2$O and water before or on entry thereof into the deN$_2$O stage in such an amount that the NO$_x$ present in the gas stream is partly degraded, such that the molar ratio of $N_2O$ and $NO_x$, immediately after the entry of the gas stream comprising $NO_x$ and $N_2O$ in the $deN_2O$ stage, is at least 1.5.

4. The process as claimed in claim 3, wherein the water content of the gas stream comprising $N_2O$, $NO_x$ and water, before it enters the $deN_2O$ stage, is adjusted by addition of water vapor and/or by addition of water in liquid form.

5. The process as claimed in claim 1, wherein the water content of the gas stream comprising $N_2O$, $NO_x$ and water before it enters the $deN_2O$ stage is adjusted by introducing an offgas stream from a combustion stage in which hydrogen and/or hydrogen-containing compounds are combusted, and/or wherein the water content of the gas stream comprising $N_2O$, $NO_x$ and water is adjusted before it enters the $deN_2O$ stage by passing it through a water loading apparatus selected from a group comprising saturators and absorption towers.

6. The process as claimed in claim 1, wherein the gas stream comprising $N_2O$, $NO_x$ and water, before it enters the $deN_2O$ stage, is heated by means of a heating apparatus to a temperature between 400° C. and 650° C.

7. The process as claimed in claim 1, wherein the resulting gas stream from the $deN_2O$ stage is supplied to a cooling apparatus which is a recuperator, the heat released being transferred to the gas stream comprising $N_2O$, $NO_x$ and water before it enters the $deN_2O$ stage, thus heating it to a temperature between 400° C. and 650° C.

8. The process as claimed in claim 1, wherein the gas stream comprising $N_2O$, $NO_x$ and water, viewed in flow direction, is divided into two substreams upstream of a heating apparatus, a first substream, after bypassing the heating apparatus, being combined again with the second substream which has passed through the heating apparatus, or wherein the gas stream bypasses the heating apparatus, the amount of the sub streams being regulated by means of a valve.

9. The process as claimed in claim 1, wherein the $deN_2O$ stage has an upstream guard bed which comprises random packings or structured packings of shaped bodies comprising alumina.

10. The process as claimed in claim 1, wherein the $deNO_x$ stage comprises a $deNO_x$ catalyst based on $V_2O_5$—$TiO_2$.

11. The process as claimed in claim 1, wherein the process in the $deN_2O$ stage is performed at space velocities of 2000 to 50 000 $h^{-1}$.

12. The process as claimed in claim 1, wherein the reducing agent for $NO_x$ is ammonia.

13. The process as claimed in claim 1, wherein space velocity, temperature and pressure in the $deNO_x$ stage are adjusted such that $NO_x$ conversions between 80% and 100% are attained.

14. The process as claimed in claim 1, wherein the ratio of the molar amount of $N_2O$ which enters the $deN_2O$ stage to the molar amount of $NO_x$ which leaves the $deN_2O$ stage is at least 2.

15. The process as claimed in claim 1, wherein the ratio of the molar amount of $N_2O$ which enters the $deN_2O$ stage to the molar amount of $NO_x$ which leaves the $deN_2O$ stage is at least 5.

16. The process as claimed in claim 6, wherein the heating apparatus is a heat exchanger.

17. The process as claimed in claim 1, wherein the iron-laden zeolite catalyst of the $deN_2O$ stage is based on a BEA or WI type zeolite.

18. The process as claimed in claim 1, wherein the iron-laden zeolite catalyst of the $deN_2O$ stage is based on a ZSM-5 zeolite.

19. The process as claimed in claim 1, wherein the process in the $deN_2O$ stage is performed at space velocities of 2500 to 25 000 $h^{-1}$.

20. The process as claimed in claim 1, wherein the process in the $deN_2O$ stage is performed at space velocities of 3000 to 20 000 $h^{-1}$.

21. The process as claimed in claim 1, wherein space velocity, temperature and pressure in the $deNO_x$ stage are adjusted such that $NO_x$ conversions between 90% and 100% are attained.

22. The process as claimed in claim 1, wherein the iron-laden zeolite catalyst of the $deN_2O$ stage is based on a zeolite type selected from the group consisting of MFI, BEA, FER, MOR, MEL, and mixtures thereof, and the $deNO_x$ stage comprises a transition metal-comprising SCR catalyst.

23. The process as claimed in claim 1, wherein the $N_2O$ degradation in the $deN_2O$ stage is 90 to 95%.

* * * * *